United States Patent
Rodriguez et al.

(10) Patent No.: US 6,725,241 B1
(45) Date of Patent: Apr. 20, 2004

(54) METHOD AND APPARATUS FOR FREEING MEMORY IN A DATA PROCESSING SYSTEM

(75) Inventors: Herman Rodriguez, Austin, TX (US); Miguel Sang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,685

(22) Filed: Mar. 31, 1999

(51) Int. Cl.$^7$ ............................................... G06F 17/30
(52) U.S. Cl. ........................ 707/203; 707/205; 711/165; 711/170
(58) Field of Search ............................. 707/203–206, 707/1–10; 711/132, 103, 136, 165, 216, 170–172; 717/5–6

(56) References Cited

U.S. PATENT DOCUMENTS

| | | | |
|---|---|---|---|
| 4,530,054 A | 7/1985 | Hamstra et al. | 711/133 |
| 5,189,733 A | 2/1993 | Bennett et al. | 711/170 |
| 5,241,673 A * | 8/1993 | Schelvis | 707/103 R |
| 5,321,834 A | 6/1994 | Weiser et al. | 707/206 |
| 5,392,415 A | 2/1995 | Badovinatz et al. | 709/100 |
| 5,457,793 A | 10/1995 | Elko et al. | 707/205 |
| 5,493,668 A | 2/1996 | Elko et al. | 711/130 |
| 5,526,519 A | 6/1996 | Maruyanma et al. | 707/123 |
| 5,823,515 A | 10/1998 | Takehara et al. | 267/140.13 |
| 5,845,298 A * | 12/1998 | O'Connor et al. | 707/206 |
| 5,873,105 A * | 2/1999 | Tremblay et al. | 707/206 |
| 6,081,665 A * | 6/2000 | Nilsen et al. | 717/5 |
| 6,105,040 A * | 8/2000 | Agesen | 707/206 |
| 6,148,310 A * | 11/2000 | Azagury et al. | 707/206 |
| 6,286,016 B1 * | 9/2001 | Heller et al. | 707/206 |

* cited by examiner

*Primary Examiner*—Shahid Alam
*Assistant Examiner*—Jean Bolte Fleurantin
(74) *Attorney, Agent, or Firm*—Duke W. Yee; Jeffrey S. LaBaw; Stephen R. Tkacs

(57) ABSTRACT

A method and apparatus in a computer freeing space in a memory, wherein a plurality of objects are present within the memory. Responsive to an indication that space needs to be freed in the memory, an object is identified within the plurality of objects that is an oldest, least recently used object that is in use in the memory, wherein the object is an identified object and has a set of object attributes. The set of object attributes is inspected for the identified object to determine whether the identified object is a candidate for storage in a seldom used object store. Responsive to a determination that the identified object is a candidate, the object is copied to the seldom used object store, wherein the identified object becomes a relocated object. References to the relocated object to a location of the relocated object in the seldom used object store are adjusted. Space is freed in the memory occupied by the relocated object.

34 Claims, 5 Drawing Sheets

METHOD AND APPARATUS FOR FREEING MEMORY IN A DATA PROCESSING SYSTEM

BACKGROUND OF THE INVENTION

1. Technical Field

The present invention provides an improved data processing system and in particular the present invention provides a method and apparatus for memory management in a data processing system. Still more particularly, the present invention provides a method and apparatus for freeing memory in a data processing system.

2. Description of Related Art

In object oriented systems, data and methods are integrated into objects. An object includes data of arbitrary length and a method of arbitrary length. As a result, management of objects in an object oriented environment, in such a system requires an ability to manage memory areas of variable size. When the entire memory space has been used through allocation of memory space for objects, it becomes necessary to collect unused areas in the memory to provide memory space as another resource. Garbage collection is performed by a garbage collector to reclaim the memory space used by objects that are no longer referenced by an application.

Such a garbage management collection is important when a virtual machine, such as a Java virtual machine, needs additional free memory to be allocated for an object. The memory area typically managed for objects is called a heap. The allocation and freeing of memory in a heap is usually allocated and freed in set blocks. A single heap exists within a Java virtual machine instance. A separate heap, however, exists for each instance of the Java virtual machine. Since each application is associated with a single instance of a Java virtual machine, two Java applications will not trample or use each other's heap data. The Java virtual machine has instructions to allocate memory on the heap for a new object, but includes no instruction for freeing that memory. The Java virtual machine is responsible, however, to decide whether and when to free memory occupied by objects no longer referenced by the running application. Even with a garbage collector, it is possible to have a situation in which a sufficient amount of memory is unavailable when allocating a new object. This situation may arise when objects still being referenced by an application consume all of the available memory within the heap. With the increasing size of applications and objects and the limited amount of memory on different types of computers, such a situation is likely. If memory is unavailable to allocate the new object, the Java virtual machine is unable to proceed and execution is halted.

Therefore it would be advantageous to have an improved method and apparatus for managing memory in a data processing system.

SUMMARY OF THE INVENTION

The present invention provides a method and apparatus in a computer freeing space in a memory, wherein a plurality of objects are present within the memory. Responsive to an indication that space needs to be freed in the memory, an object is identified within the plurality of objects that is an oldest, least recently used object that is in use in the memory, wherein the object is an identified object and has a set of object attributes. The set of object attributes is inspected for the identified object to determine Whether the identified object is a candidate for storage in a seldom used object store. Responsive to a determination that the identified object is a candidate, the object is copied to the seldom used object store, wherein the identified object becomes a relocated object. References to the relocated object to a location of the relocated object in the seldom used object store are adjusted. Space is freed in the memory occupied by the relocated object.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
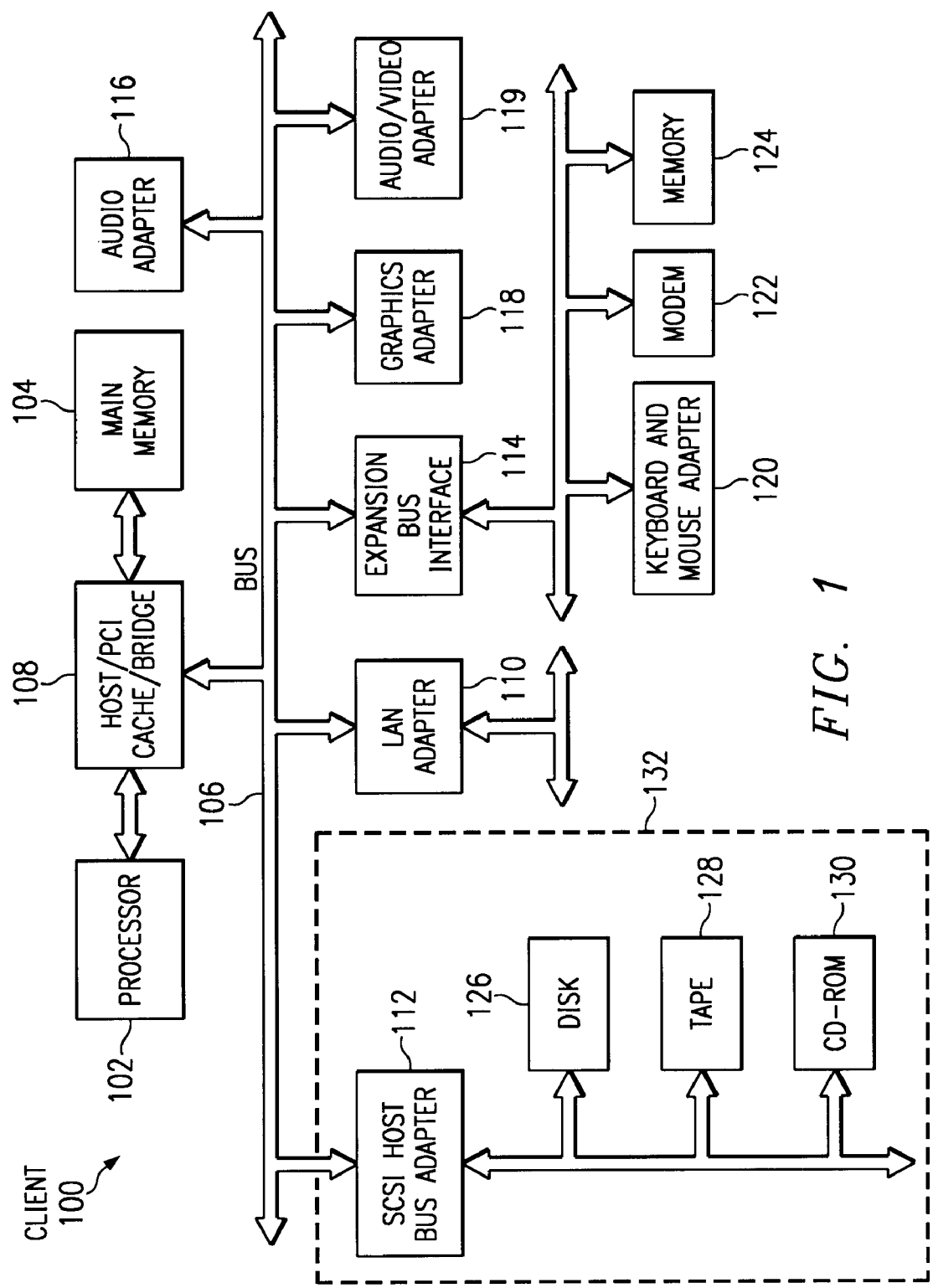
FIG. 1 is a block diagram illustrating a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device which is configured with ROM and/or flash ROM in order to provide non-volatile memory for storing operating system files and/ or user-generated data.

The depicted example in FIG. 1 and above-described examples are not meant to imply architectural limitations.

Figure 2:
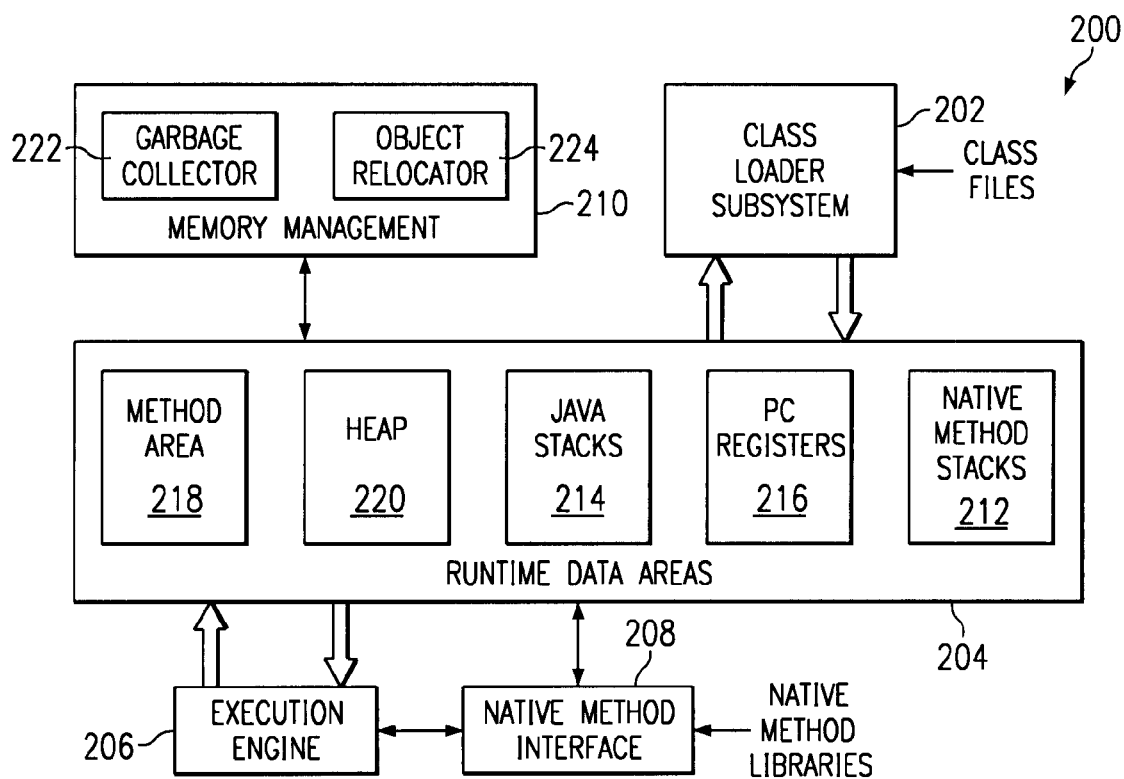
FIG. 2 is a block diagram of a Java virtual machine depicted in accordance with a preferred embodiment of the present invention.

The present invention provides a method, apparatus, and instructions for freeing memory in a data processing system. In particular, the mechanism of the present invention makes memory space available for object allocation. The mechanism of the present invention may be initiated in a number of ways. For example, the freeing of memory space may occur when a garbage collector is unable to reclaim free memory or when memory becomes low. The mechanism of the present invention will timestamp an object whenever it is accessed or referenced. When a garbage collector runs, if all of the memory is used and the garbage collector is unable to reclaim memory or if the memory is below or reaches a pre-defined threshold, the process of the present invention is initiated. The present invention will identify the oldest, least recently used (LRU) object that is in use. Also, the object attributes associated with the object will be inspected to determine whether the object is a candidate for storage, also called seldom object storage. The object attributes include, for example, inheritance and class. If the LRU warrants storage after examination of the attributes, the object is then copied to a secondary storage, such as for example, flash memory or a hard disk drive. The references to the object are adjusted to point to the location of the object in the storage using an object handle that denotes the located object. Thereafter, the memory space in the memory occupied by the object is reclaimed. In the depicted examples, references to objects are to objects in an object oriented environment. These processes may be implemented in a number of different environments in which memory management is desired. With reference now to FIG. 2, a block diagram of a Java virtual machine is depicted in accordance with a preferred embodiment of the present invention. In the depicted examples, a Java virtual machine is the environment in which the processes of the present invention are illustrated.

Java virtual machine (JVM) 200 includes a class loader subsystem 202, which is a mechanism for loading types, such as classes and interfaces, given fully qualified names. JVM 200 also contains runtime data areas 204, execution engine 206, native method interface 208, and memory management 210. Execution engine 206 is a mechanism for executing instructions contained in the methods of classes loaded by class loader subsystem 202. Execution engine 206 may be, for example, a Java interpreter or a just in time compiler. Native method interface 208 allows access to resources in the underlying operating system. Native method interface 208 may be, for example, a Java native interface.

Runtime data areas 204 contains native method stacks 212, Java stacks 214, PC registers 216, method area 218, and heap 220. These different data areas represent the organization of memory needed by JVM 200 to execute a program. Java stacks 214 is used to store the state of Java method invocations while PC registers 216 is used to indicate the next instruction to be executed. Native method stacks 212 stores the state of invocations of native methods. Method area 218 contains class data while heap 220 contains all instantiated objects. Each time a class instance or array is created, the memory for the new object is allocated from heap 220. JVM 200 includes an instruction that allocates memory space within the memory for heap 220, but includes no instruction for freeing that space within the memory. Memory management 210 in the depicted example manages memory space within the memory allocated to heap 220. Memory management 210 may include a garbage collector 222, which automatically reclaims memory used by objects that are no longer referenced by an application. Additionally, garbage collector 222 also may move objects to reduce heap fragmentation. Memory management 210 also may include an object relocator 224, which implements the processes of the present invention to relocate objects to a seldom used object store.

Figure 3A:
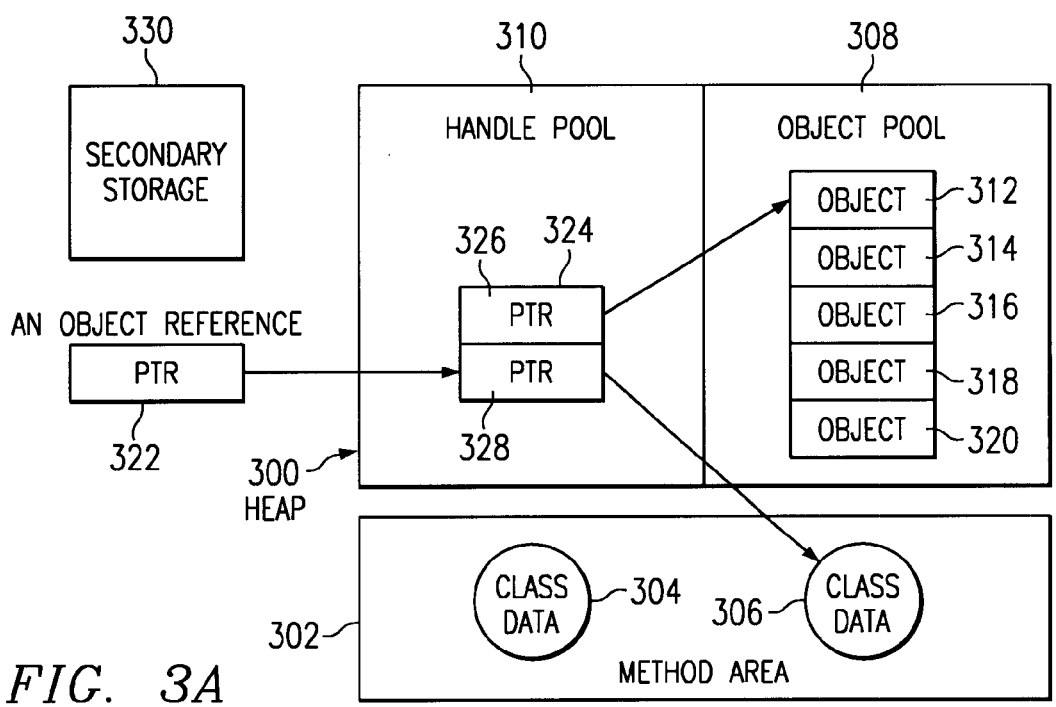
FIGS. 3A–3C are diagrams illustrating relocation of an object depicted in accordance with a preferred embodiment of the present invention.
Figure 3B:
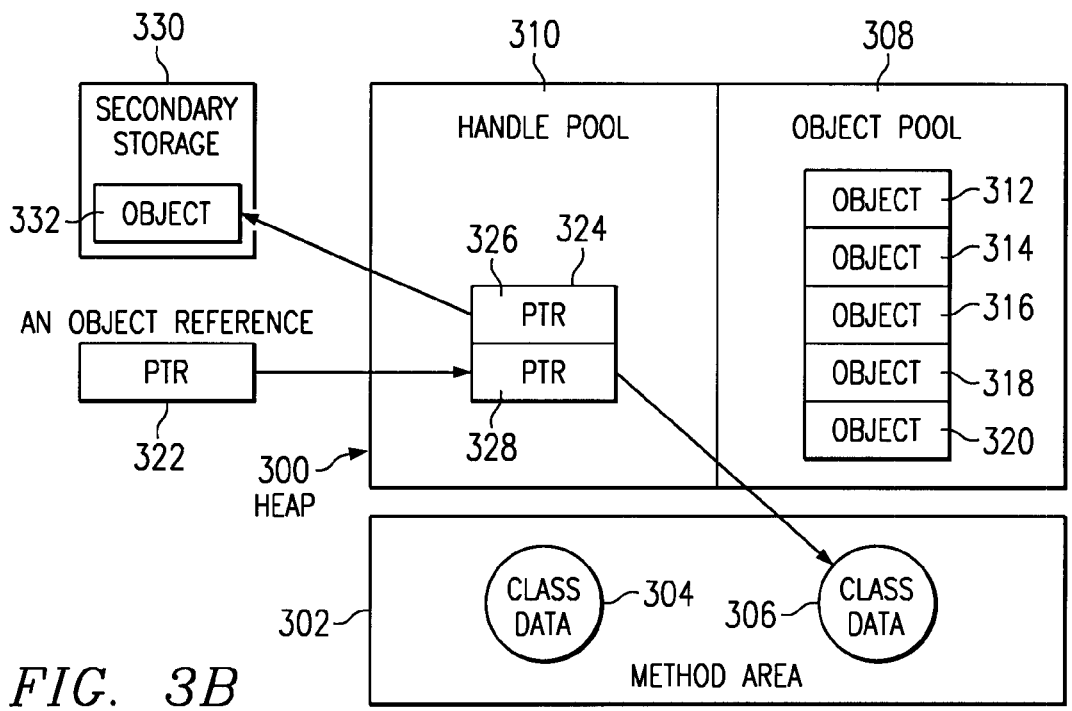
Figure 3C:
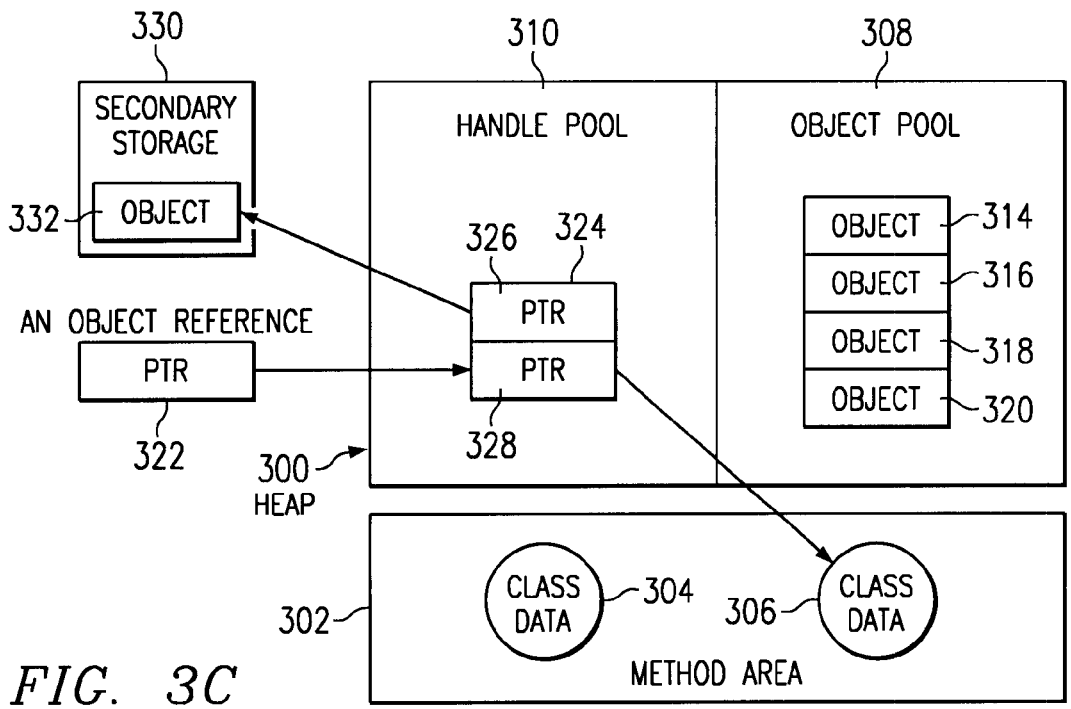

With reference now to FIGS. 3A–3C, diagrams illustrating relocation of an object is depicted in accordance with a preferred embodiment of the present invention. In FIG. 3A, a heap 300 and a method area 302 are shown. Method area 302 includes class data 304 and class data 306. Heap 300 contains an object pool 308 and a handle pool 310 in which object pool 308 contains objects 312–320. These objects are accessed using object references, which are pointers to handles in handle pool 310.

When an object, such as object 312, is to be accessed, an object reference 322 is provided, which is a pointer to handle 324 in handle pool 310. In this example, handle 324 includes a pointer 326, which points to object 312 in object pool 308. In addition, handle 324 also includes a pointer 328, which points to class data 306 in method area 302.

Secondary storage 330 is the storage in which an object from object pool 308 will be placed when relocated by an object relocator, such as object relocator 224 in FIG. 2. When a request to allocate space from the memory in object pool 308 is received, a determination is made as to whether memory space is available to satisfy the request. If insufficient memory space is available, a garbage collector, such as garbage collector 222 in FIG. 2, may be used to free memory space in the memory allocated to object pool 308. If the garbage collector is unable to free sufficient memory space, or the free memory space is below a selected threshold, an object within object pool 308 may be relocated or moved to storage 330.

In doing so, each object includes a timestamp that is associated with the object each time it is accessed. Using this timestamp, an object within object pool 308 may be identified that is the oldest object and the least recently used object. The time stamp can be stored in the object's internal header, or in an extension pointed to by the object's header.

There are several time stamps. For example, the object's time of creation, the last time the object was accessed. Also, an object use count is included in the header area. These are values used in marking the determination whether an object has been recently used, and in locating the oldest objects.

When scanning for the oldest, least recently used object, a simple time stamp sorting algorithm (oldest to newest) can be used to locate the oldest object, then the usage count can be used to determine the least recently used.

When such an object is identified, object attributes associated with that object also is inspected to determine whether the object is a candidate for relocation, which is also referred to as seldom object storage. Object attributes may include features such as size of object, such that small objects may not be candidates for the object store. Another feature may be, for example, the object (parent) owner, reflecting the fact that for some applications it makes sense to place objects in the object store, such as word processing objects, but not for others such as temporary objects created during a simple business transaction In FIG. 3B, object 312 is copied from object pool 308 into secondary storage 330 to form a relocated object 332. Further, the reference to object 312 is changed to point to the location of relocated object 322 in secondary storage 330. Pointer 326 in handle 324 is changed to point to relocated object 332 in secondary storage 330. In this example, pointer 328 still points to class data 306 in method area 302. Object 312 is then removed to provide space within the memory allocated to object pool 308 as shown in FIG. 3C.

Figure 4:
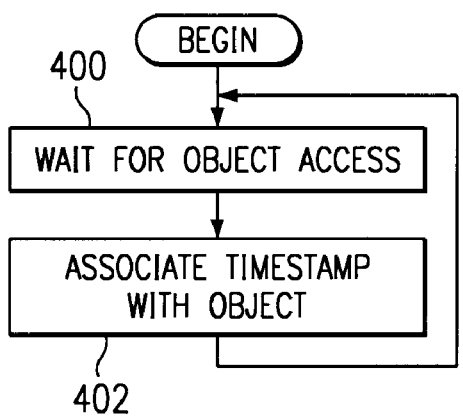
FIG. 4 is a flowchart of a process for timestamping objects depicted in accordance with a preferred embodiment of the present invention.

With reference now to FIG. 4, a flowchart of a process for timestamping objects is depicted in accordance with a preferred embodiment of the present invention. The process begins by waiting for an object access (step 400). In the depicted examples, access to an object includes a read or write of the object. Upon occurrence of an object access, a timestamp is associated with the object (step 402). With the process then returning to step 400 to wait for another object to access. An extension in the object's header is one location for associating the time stamp with the object. Of course, a separate table could be created to simply store time stamps, and a reference to the object's handle.

Figure 5:
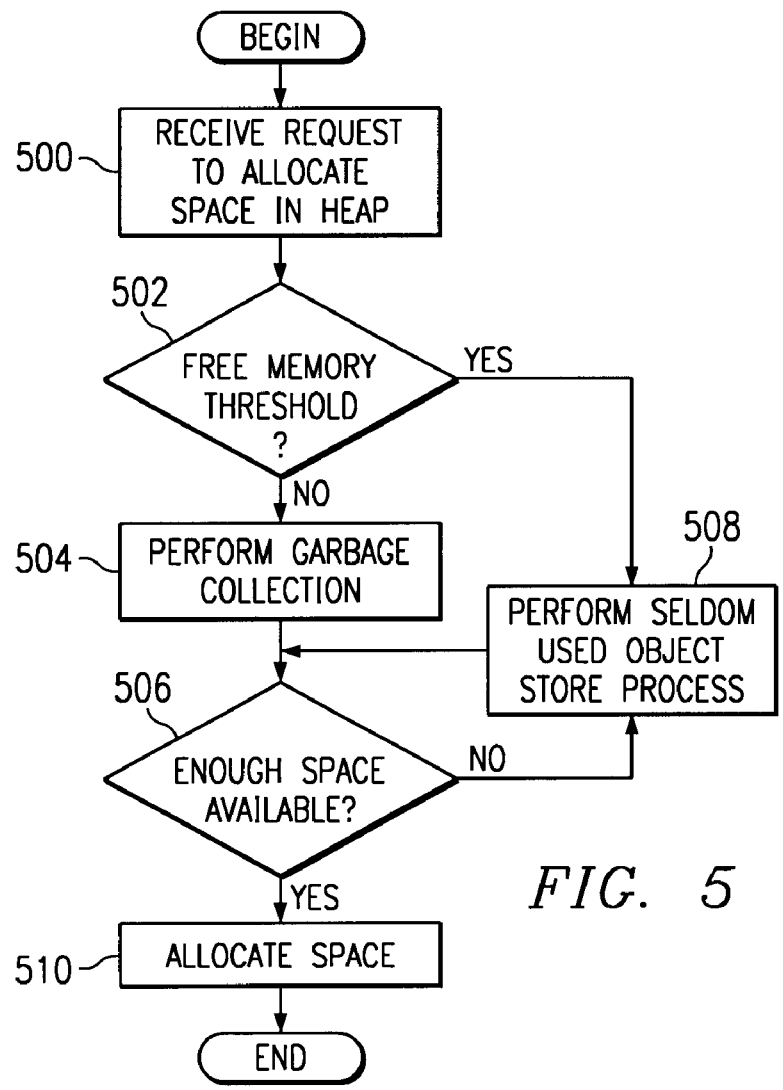
FIG. 5 is a flowchart of a process to allocate memory space in a heap depicted in accordance with a preferred embodiment of the present invention.

Turning next to FIG. 5, a flowchart of a process to allocate memory space in a heap is depicted in accordance with a preferred embodiment of the present invention. This process may be implemented in memory management 210 in FIG. 2. The process begins by receiving a request to allocate memory space in the heap (step 500). This request may be made when a new object is to be instantiated. Other examples of allocating memory in the heap are, for example, temporary space for the user's stacks and virtual memory areas used by the virtual machine. A determination is then made as to whether the free memory is less than a selected threshold (step 502). One way the threshold may be selected is statically during system configuration by the system administrator. Another way can be dynamically, by specifying that after a certain percentage of memory used, the object store functions should be made active. In the depicted examples, if the threshold value is not reached, only the physical memory is used. If the memory is not less than the threshold, the process then performs garbage collection (step 504). This garbage collection uses known garbage collection processes and may be implemented within garbage collector 222 in FIG. 2. Thereafter, a determination is made as to whether enough memory space is available to allocate for the request (step 506). If sufficient memory space is unavailable, then a seldom used object store process is performed (step 508). This process is used to identify objects that may be stored or relocated in a secondary memory. This step is described in more detail in FIG. 6 below.

Afterwards, the process returns to step 506 to determine whether sufficient memory space is now available to satisfy the request. If insufficient memory space is present, the process will again proceed to step 508 as described above. Otherwise, the process will allocate the memory space according to the request (step 510) with the process termination thereafter.

With reference again to step 502, if the amount of free memory is less than the threshold, then the process also will proceed to step 508.

Figure 6:
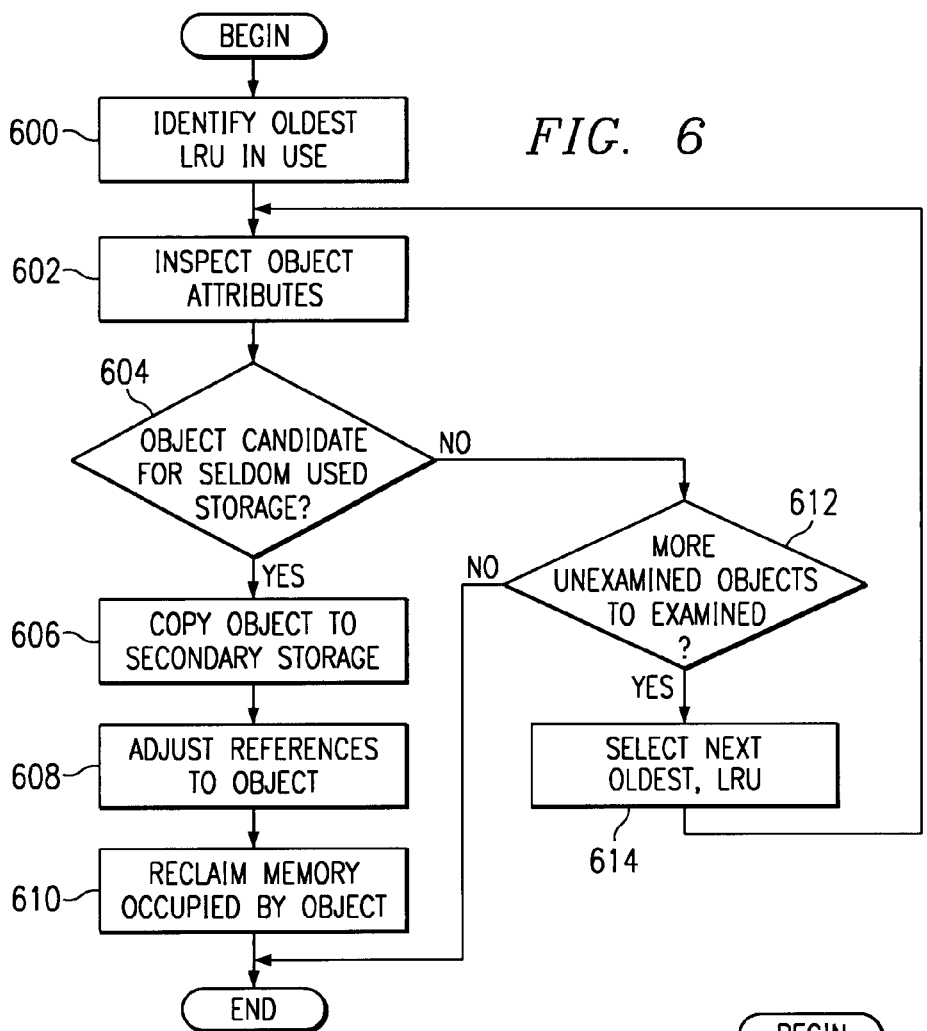
FIG. 6 is a flowchart of a seldom used object store process depicted in accordance with a preferred embodiment of the present invention.

With reference next to FIG. 6, a flowchart of a seldom used object store process in depicted in accordance with a preferred embodiment of the present invention. This process is used to free up memory occupied by an object for other uses. In the depicted example's, the process is used within a JVM to free up memory in a heap.

The process begins by identifying the oldest least recently used (LRU) object in use (step 600). After an object has been identified that is the oldest LRU object, the set of attributes for that object are inspected (step 602). A determination is made from the inspection to determine whether the object is a candidate for seldom used storage (step 604) This determination may be made based on the size of the object. For example, small objects may not be a good candidate for storage using the processes of the present invention. Another feature or attribute of the object that may be examined to determine whether the object is a good candidate for seldom storage is an identification of the object owner, the parent of the present object. If the object owner is, for example, an object that will seldom access this object, then the object may be a good candidate for seldom used storage. On the other hand, if the object is a temporary object created during a simple business transaction, then these types of objects may not be good candidate for seldom used storage. Of course, other attributes or criteria may be used to select objects for seldom used storage. If the object is a candidate for seldom used storage, the process then copies the object into a secondary storage (step 606). Thereafter, the references to the object are adjusted to indicate that the object is no longer in the heap and is not in a secondary storage (step 608). The memory occupied by the object is then reclaimed for other use (step 610) with the process terminating thereafter.

With reference again to step 604, if the object is not a candidate for seldom used storage, a determination is then made as to whether additional unexamined objects are present to consider (step 612). If additional objects are present, the next oldest LRU object is then selected for examination (step 614) with the process then returning to step 602. If additional objects are not present in step 612, the process terminates.

Figure 7:
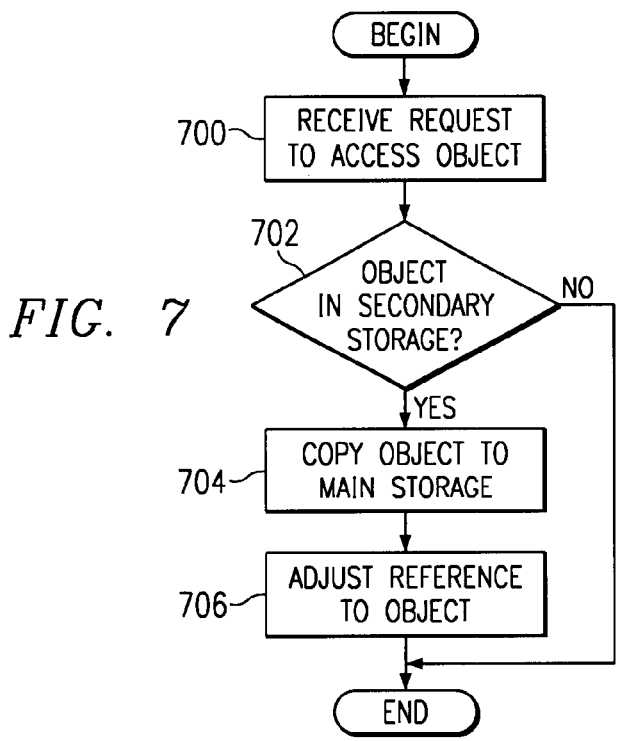
FIG. 7 is a flowchart of a process for accessing objects illustrated in accordance with a preferred embodiment of the present invention.

Turning next to FIG. 7, a flowchart of a process for accessing objects is illustrated in accordance with a preferred embodiment of the present invention. The process begins by receiving a request to access an object (step 700). This request is made using a reference to the object. A determination is made as to whether the object is located in secondary storage (step 702). This determination may be made by examining the handle to see if it indicates that the object has been relocated to the secondary storage. If the object is located in secondary storage, then a copy of the object is made to the main storage (step 704). In the depicted examples, the copy of the object into main storage is made by copying the object back into the heap. The reference to the object is then adjusted to reflect the object's presence in the main storage (step 706). This reference is the pointer in the handle.

With reference again to step 702, if the object is not located in secondary storage, the process terminates.

Thus, the present invention provides an improved method, apparatus, and instructions for freeing memory within a data processing system. The present invention provides this advantage by relocating objects occupying memory to another storage device, such as, for example, a secondary memory or a hard disk drive. The present invention takes advantage of the fact that objects that are long lived are seldom accessed and often simply serve as anchors for small and short-lived objects.

The present invention is especially useful on systems that feature objects and garbage collectors, where RAM space is at a premium, but secondary storage is an option. Application of the processes of the present invention makes it possible to reduce the memory footprint without adversely affecting performance of the data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the processes of the present invention have been illustrated in the context of a garbage collection mechanism, the present invention may be implemented in a paging mechanism in which objects are paged between main memory and a secondary storage. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer freeing space in a memory, wherein a plurality of objects are present within the memory, the method comprising:

responsive to an indication that space needs to be freed in the memory, identifying an object within the plurality of objects that is an oldest, least recently used object that is in use in the memory, wherein the object is an identified object and has a set of object attributes;

inspecting the set of object attributes for the identified object to determine whether the identified object is a candidate for storage in a seldom used object store;

responsive to a determination that the identified object is a candidate, copying the object to the seldom used object store, wherein the identified object becomes a relocated object;

adjusting references to the relocated object to a location of the relocated object in the seldom used object store; and freeing space in the memory occupied by the relocated object.

2. The method of claim 1, wherein each object within the plurality of objects in the memory are tagged with a time stamp each time an object within the plurality of objects is referenced, wherein the time stamp is used in identifying object that is an oldest, least recently used object.

3. The method of claim 1, wherein the space in the memory is located in a heap in the memory.

4. A method in a computer freeing space in a memory, wherein a plurality of objects are present within the memory, the method comprising:

responsive to an indication that space needs to be freed in the memory, identifying an object within the plurality of objects that is an oldest, least recently used object that is in use in the memory, wherein the object is an identified object and has a set of object attributes;

inspecting the set of object attributes for the identified object to determine whether the identified object is a candidate for storage in a seldom used object store;

responsive to a determination that the identified object is a candidate, copying the object to the seldom used object store, wherein the identified object becomes a relocated object;

adjusting references to the relocated object to a location of the relocated object in the seldom used object store;

freeing space in the memory occupied by the relocated object;

receiving a request to allocate space in the memory;

reclaiming memory space from deleted objects;

responsive to reclaiming memory, determinig whether sufficient space is available to satisfy the request; and responsive to a determination that insufficient space is present, generating an indication that space needs to be freed in the memory.

5. The method of claim 1 further comprising:

responsive to a request to access the relocated object in the seldom used object store, copying the relocated object from the seldom used object store into a location in the memory, wherein the relocated object becomes a restored object; and changing the reference to the restored object to the location in the memory.

6. The method of claim 1, wherein the method is executed by a Java virtual machine.

7. The method of claim 1, wherein the seldom used object store is a random access memory.

8. The method of claim 1, wherein the seldom used object store is a medium suitable for data storage other than memory allocated for the plurality of objects.

9. A method for freeing space in a memory in a computer, the method comprising the computer implemented steps of:

responsive to an indication that space within the memory needs to be freed, identifying an object that is an oldest and least recently used object, wherein the object is an identified object;

determining whether the identified object is a candidate for storage based on a set of attributes associated with identified object;

responsive to a determination that the identified object is a candidate, copying the identified object in a storage device;

adjusting references to the object to point to a location of the identified object in the storage device; and freeing space occupied by the identified object in the memory.

10. The method of claim 9, wherein the method is executed by a Java virtual machine.

11. The method of claim 9, wherein each object within the plurality of objects in the memory are tagged with a time stamp each time an object within the plurality of objects is referenced, wherein the time stamp is used in identifying the object that is an oldest, least recently used object.

12. The method of claim 9, wherein the space in the memory is located in a heap in the memory.

13. The method of claim 9 further comprising:

responsive to a request to access the identified object in the seldom used object store, copying the identified object into a location in the memory from the storage device; and changing the reference to the identified object to the location in the memory.

14. The method of claim 9, wherein the storage device is a random access memory.

15. The method of claim 9, wherein the storage device is a medium suitable for data storage other than memory allocated for the plurality of objects.

16. A Java virtual machine comprising:

a class loader, wherein the class loader loads classes;

a runtime data area including:

a method area, wherein the method area holds class data;

a heap, wherein the heap holds objects, wherein each object within the heap has a set of attributes; and a memory manager, wherein the memory manager includes a plurality of modes of operation including:

a first mode of operation, responsive to an indication that space within the memory needs to be freed in which the memory manager identifies an object in the heap that is an oldest and least recently used object, wherein the object is an identified object;

a second mode of operation, responsive to the first mode of operation, in which the memory manager determines whether the identified object is a candidate for storage based on a set of attributes associated with identified object;

third mode of operation, responsive to a determination that the identified object is a candidate, in which the memory manager copies the identified object in a storage device;

a fourth mode of operation in which the memory manager adjusts references to the identified object to point to a location of the identified object in the storage device; and a fifth mode of operation, responsive to copying the identified object in the heap to the storage device, in which the memory manager frees space occupied by the object inthe memory.

17. The Java virtual machine of claim 16, wherein the plurality of modes of operation in the memory manager further includes a sixth mode of operation in which the memory manager monitors for requests to allocate space in the memory;

a seventh mode of operation, responsive to detecting a request to allocated space in the sixth mode of operation, in which the memory manager reclaims memory space from deleted objects;

an eighth mode of operation, responsive to reclaiming memory in the seventh mode of operation, in which the memory manager determines whether sufficient space is available to satisfy the request; and a ninth mode of operation, responsive to a determination that insufficient space is present in the eighth mode of operation, in which the memory manager generates an indication that space needs to be freed in the memory.

18. A data processing system in a computer freeing space in a memory, wherein a plurality of objects are present within the memory, the data processing system comprising:

identifying means, responsive to an indication that space needs to be freed in the memory, for identifying an object within the plurality of objects that is an oldest, least recently used object that is in use in the memory, wherein the object is an identified object and has a set of object attributes;

inspecting means for inspecting the set of object attributes for the identified object to determine whether the identified object is a candidate for storage in a seldom used object store;

copying means, responsive to a determination that the identified object is a candidate, for copying the object to the seldom used object store, wherein the identified object becomes a relocated object;

adjusting means for adjusting references to the relocated object to a location of the relocated object in the seldom used object store; and space freeing means for freeing space in the memory occupied by the relocated object.

19. The data processing system of claim 18, wherein each object within the plurality of objects in the memory are tagged with a time stamp each time an object within the plurality of objects is referenced, wherein the time stamp is used in identifying the object that is an oldest, least recently used object.

20. The data processing system of claim 18, wherein the space in the memory is located in a heap in the memory.

21. A data processing system in a computer freeing space in a memory, wherein a plurality of objects are present within the memory, the data processing system comprising:

identifying means, responsive to an indication that space needs to be freed in the memory, for identifying an object within the plurality of objects that is an oldest least recently used object that is in use in the memory, wherein the object is an identified object and has a set of object attributes;

inspecting means for inspecting the set of object attributes for the identified object to determine whether the identified object is a candidate for storage in a seldom used object store;

copying means, responsive to a determination that the identified object is a candidate, for copying the object to the seldom used object store, wherein the identified object becomes a relocated object;

adjusting means for adjusting references to the relocated object to a location of the relocated object in the seldom used object store;

space freeing means for freeing space in the memory occupied by the relocated object;

receiving means for receiving a request to allocate space in the memory, reclaiming means for reclaiming memory space from deleted objects;

determining means, responsive to reclaiming memory, for determining whether sufficient space is available to satisfy the request; and generating means, responsive to a determination that insufficient space is present, for generating an indication that space needs to be freed in the memory.

22. The data processing system of claim 18 further comprising:

copying means, responsive to a request to access the relocated object in the seldom used object store, for copying the relocated object from the seldom used object store into a location in the memory, wherein the relocated object becomes a restored object; and changing means for changing the reference to the restored object to tie location in the memory.

23. The data processing system of claim 18, wherein the method is executed by a Java virtual machine.

24. The data processing system of claim 18, wherein the seldom used object store is a random access memory.

25. The data processing system of claim 18, wherein the seldom used object store is a medium suitable for data storage other than memory allocated for the plurality of objects.

26. A data processing system for freeing space in a memory in a computer, the data processing system comprising:

identifying means, responsive to an indication that space within the memory needs to be freed, for identifying an object that is an oldest and least recently used object, wherein the object is an identified object;

determinig means for determining whether the identified object is a candidate for storage based on a set of attributes associated with identified object;

copying means, responsive to a determination that the identified object is a candidate, for copying the identified object in a storage device;

adjusting means for adjusting references to the object to point to a location of the identified object in the storage device; and space freeing means for freeing space occupied by tile identified object in the memory.

27. The data processing system of claim 26, wherein the method is executed by a Java virtual machine.

28. The data processing system of claim 26, wherein each object within the plurality of objects in the memory are tagged with a time stamp each time an object within the plurality of objects is referenced, wherein the time stamp is used in identifying the object that is an oldest, least recently used object.

29. The data processing system of claim 26, wherein the space in the memory is located in a heap in the memory.

30. The data processing system of claim 26 further comprising:

copying means, responsive to a request to access the identified object in the seldom used object store, for copying the identified object into a location in the memory from the storage device; and changing means for changing the reference to the identified object to the location in the memory.

31. The data processing system of claim 26, wherein the storage device is a random access memory.

32. The data processing system of claim 26, wherein the storage device is a medium suitable for data storage other than memory allocated for the plurality of objects.

33. A computer program product in a computer readable medium freeing space in a memory, wherein a plurality of objects are present within the memory, the computer program product comprising:

first instructions, responsive to an indication that space needs to be freed in the memory, for identifying an object within the plurality of objects that is an oldest, least recently used object that is in use in the memory, wherein the object is an identified object and has a set of object attributes;

second instructions for inspecting the set of object attributes for the identified object to determine whether the identified object is a candidate for storage in a seldom used object store;

third instructions, responsive to a determination that the identified object is a candidate, for copying the object to the seldom used object store, wherein the identified object becomes a relocated object;

fourth instructions for adjusting references to the relocated object to a location of the relocated object in the seldom used object store; and fifth instructions for freeing space in the memory occupied by the relocated object.

34. A computer program product in a computer readable medium for freeing space in a memory in a computer, the computer program product comprising:

first instructions, responsive to an indication that space within the memory needs to be freed, for identifying an object that is an oldest and least recently used object, wherein the object is an identified object;

second instructions for determining whether the identified object is a candidate for storage based on a set of attributes associated with identified object;

third instructions, responsive to a determination that the identified object is a candidate, for copying the identified object in a storage device;

fourth instructions for adjusting references to the object to point to a location of the identified object in the storage device; and fifth instructions for freeing space occupied by the identified object in the memory.

* * * * *

UNITED STATES PATENT AND TRADEMARK OFFICE
CERTIFICATE OF CORRECTION

PATENT NO. : 6,725,241 B1
APPLICATION NO. : 09/282685
DATED : April 20, 2004
INVENTOR(S) : Rodriguez et al.

It is certified that error appears in the above-identified patent and that said Letters Patent is hereby corrected as shown below:

Col. 10, line 2: after "object" delete "inthe" and insert --in the--.

Col. 11, line 24: after "object to" delete "tie" and insert --the--.

Col. 11, line 49: after "occupied by" delete "tile" and insert --the--.

Signed and Sealed this

Fifth Day of December, 2006

JON W. DUDAS
*Director of the United States Patent and Trademark Office*